US011017550B2

(12) United States Patent
Frossard et al.

(10) Patent No.: US 11,017,550 B2
(45) Date of Patent: May 25, 2021

(54) END-TO-END TRACKING OF OBJECTS

(71) Applicant: UATC, LLC, San Francisco, CA (US)

(72) Inventors: Davi Eugenio Nascimento Frossard, Toronto (CA); Raquel Urtasun, Toronto (CA)

(73) Assignee: UATC, LLC, Mountain View, CA (US)

( * ) Notice: Subject to any disclaimer, the term of this patent is extended or adjusted under 35 U.S.C. 154(b) by 132 days.

(21) Appl. No.: 16/122,203

(22) Filed: Sep. 5, 2018

(65) Prior Publication Data
US 2019/0147610 A1 May 16, 2019

Related U.S. Application Data

(60) Provisional application No. 62/586,700, filed on Nov. 15, 2017.

(51) Int. Cl.
*G06T 7/70* (2017.01)
*G06T 7/90* (2017.01)
*G06T 7/20* (2017.01)

(52) U.S. Cl.
CPC .................. *G06T 7/70* (2017.01); *G06T 7/20* (2013.01); *G06T 7/90* (2017.01); *G06T 2207/10024* (2013.01); *G06T 2207/20084* (2013.01); *G06T 2207/30252* (2013.01)

(58) Field of Classification Search
CPC . G06T 2207/30252; G06T 2207/20084; G06T 2207/10024; G06T 7/70; G06T 7/90; G06T 7/20
See application file for complete search history.

(56) References Cited

U.S. PATENT DOCUMENTS

2019/0096086 A1* 3/2019 Xu ................... G06K 9/00791
2019/0137979 A1* 5/2019 Akella ................ G06F 16/2365

OTHER PUBLICATIONS

Alahi, et al., "Social LSTM: Human Trajectory Prediction in Crowded Spaces." In Proceedings of the IEEE Conference on Computer Vision and Pattern Recognition, pp. 961-971, 2016.
Ahuja et al., "Network Flows: Theory, Algorithms, and Applications", Prentice Hall, Upper Saddle River, New Jersey, 1993, 863 pages.

(Continued)

*Primary Examiner* — Marcos L Torres
(74) *Attorney, Agent, or Firm* — Dority & Manning, P.A.

(57) ABSTRACT

Systems and methods for detecting and tracking objects are provided. In one example, a computer-implemented method includes receiving sensor data from one or more sensors. The method includes inputting the sensor data to one or more machine-learned models including one or more first neural networks configured to detect one or more objects based at least in part on the sensor data and one or more second neural networks configured to track the one or more objects over a sequence of sensor data. The method includes generating, as an output of the one or more first neural networks, a 3D bounding box and detection score for a plurality of object detections. The method includes generating, as an output of the one or more second neural networks, a matching score associated with pairs of object detections. The method includes determining a trajectory for each object detection.

9 Claims, 8 Drawing Sheets

(56) References Cited

OTHER PUBLICATIONS

Benfold et al., "Stable Multi-Target Tracking in Real-Time Surveillance Video" Conference on Computer Vision and Pattern Recognition, Colorado Springs, Colorado, Jun. 21-23, 2011, 8 pages.
Berclaz et al., "Multiple Object Tracking Using K-Shortest Paths Optimization", IEEE Transactions on Pattern Analysis and Machine Intelligence, vol. 33, Issue 9, Sep. 2011, 16 pages.
Bernardin et al., "Evaluating Multiple Object Tracking Performance: The Clear Mot Metrics", Journal on Image and Video Processing, vol. 2008, Article ID 246309, Dec. 2008, 10 pages.
Bertsekas et al., "Data Networks", Prentice Hall, Englewood Cliffs, New Jersey, 113 pages.
Birchfield et al., "Multiway Cut for Stereo and Motion with Slanted Surfaces", International Conference on Computer Vision, Kerkyra, Greece, Sep. 20-27, 1999, 7 pages.
Chen, et al., "3D object proposals using stereo imagery for accurate object class detection." IEEE Transactions on Pattern Analysis and Machine Intelligence, 2017.
Chen et al., "Multi-View 3D Object Detection Network for Autonomous Driving", Conference on Computer Vision and Pattern Recognition, Honolulu, Hawaii, Jul. 21-26, 2017, 9 pages.
Choi et al., "A General Framework for Tracking Multiple People from a Moving Camera, IEEE Transactions on Pattern Analysis and Machine Intelligence", vol. 35, Issue 7, Jul. 2013, 16 pages.
Choi et al., "Near-Online Multi-Target Tracking with Aggregated Local Flow Descriptor", International Conference on Computer Vision, Las Condes, Chile, Dec. 11-18, 2015, 9 pages.
Collins et al., "Hybrid Stochastic/Deterministic Optimization for Tracking Sports Players and Pedestrians", European Conference on Computer Vision, Zurich, Switzerland, Sep. 6-12, 2014, 16 pages.
Dai, et al., "R-FCN: Object Detection Via Region-Based Fully Convolutional Networks", In Advances in neural information processing systems, pp. 379-387, 2016.
Feichtenhofer et al., "Detect to Track and Track to Detect", International Conference on Computer Vision, Venice Italy, Oct. 22-29, 2017, 9 pages.
Gaidon et al., "Online Domain Adaptation for Multi-Object Tracking", arXiv:1508-00776v1, Aug. 4, 2015, 13 pages.
Geiger et al., "3D Traffic Scene Understanding from Movable Platforms, IEEE Transactions on Pattern Analysis and Machine Intelligence", vol. 36, Issue 5, May 2014, 14 pages.
Geiger et al., "Are We Ready for Autonomous Driving? The KITTI Vision Benchmark Suite", Conference on Computer Vision and Pattern Recognition, Providence, Rhode Island, Jun. 16-21, 2012, 8 pages.
Gong et al., "Multi-Hypothesis Motion Planning for Visual Object Tracking", International Conference on Computer Vision, Barcelona, Spain, Nov. 6-13, 2011, pp. 619-626.
Gurobi Optimization Inc., "Gurobi Optimizer Reference Manual", 2016, 773 pages.
Haeusler et al., "Ensemble Learning for Confidence Measure in Stereo Vision", Conference on Computer Vision and Pattern Recognition, Portland, Oregan, Jun. 23-28, 2013, 8 pages.
He et al., "Mask R-CNN", arXiv:1703.06870v3, Jan. 24, 2018, 12 pages.
Held et al., "Learning to Track at 100 FPS with Deep Regression Networks", arXiv:1604.01802v2, Aug. 16, 2016, 26 pages.
Howard et al., "MobileNets: Efficient Convolutional Neural Networks for Mobile Vision Applications", arXiv:1704.04861v1, Apr. 17, 2017, 9 pages.
Huang et al., "Speed/Accuracy Trade-Offs for Modern Convolutional Object Detectors", Conference on Computer Vision and Pattern Recognition, Honolulu, Hawaii, Jul. 21-26, 2017, 10 pages.
Iandola et al., "Squeezenet: AlexNet-Level Accuracy with 50X Fewer Parameters and <0.5MB Model Size", arXiv:1602.07360v4, Nov. 4, 2016, 13 pages.
Karlsruhe Institute of Technology, "The KITTI Vision Benchmark Suite", http://www.cvlibs.net/datasets/kitti/eval_tracking.php, retrieved on Sep. 18, 2018, 6 pages.
Khan et al., "Efficient Particle Filter-Based Tracking of Multiple Interacting Targets using an MRF-Based Motion Model", International Conference on Intelligent Robots and Systems, Las Vegas, Nevada, Oct. 27-31, 2003, 6 pages.
Kingma et al., "ADAM: A Method for Stochastic Optimization", arXiv:1412.6980v9, Jan. 30, 2017, 15 pages.
Kuo et al., "Multi-Target Tracking by On-Line Learned Discriminative Appearance Models" Conference on Computer Vision and Pattern Recognition, San Francisco, California, Jun. 13-18, 2010, 8 pages.
Leal-Taixé et al., "Learning by Tracking: Siamese CNN for Robust Target Association", Conference on Computer Vision and Pattern Recognition Workshops, Las Vegas, Nevada, Jun. 26-Jul. 1, 2016, 8 pages.
Lee et al., "Distant Future Prediction in Dynamic Scenes with Interacting Agents", Conference on Computer Vision and Pattern Recognition, Honolulu, Hawaii, Jul. 21-26, 2017, 10 pages.
Lee et al., "Multi-Class Multi-Object Tracking Using Changing Point Detection", arXiv:1608.08434v1, Aug. 30, 2016, 16 pages.
Lenz et al., "FollowMe: Efficient Online Min-Cost Flow Tracking with Bounded Memory and Computation", Conference on Computer Vision and Pattern Recognition, Boston, Massachusetts, Jun. 8-10, 2015, 9 pages.
Li, "3D Fully Convolutional Network for Vehicle Detection in Point Cloud",2016, arXiv:1611.08069v2, Jan. 16, 2017, 5 pages.
Li, et al., "Learning to Associate: HybridBoosted Multi-Target Tracker for Crowded Scene", Conference on Computer Vision and Pattern Recognition, Miami Beach, Florida, Jun. 20-25, 2009, 8 pages.
Lin et al., "Focal Loss for Dense Object Detection", arXiv:1708.02002v2, Feb. 7, 2018, 10 pages.
Liu et al., "SSD: Single Shot Multibox detector", arXiv:1512.02325v5, Dec. 29, 2016, 17 pages.
Luo et al., "Efficient Deep Learning for Stereo Matching", Conference on Computer Vision and Pattern Recognition, Las Vegas, Nevada, Jun. 26-Jul. 1, 2016, 9 pages.
Ma et al., "Forecasting Interactive Dynamics of Pedestrians with Fictitious Play", arXiv:1604.01431v3, Mar. 28, 2017, 9 pages.
Ma et al., "Hierarchical Convolutional Features for Visual Tracking", International Conference on Computer Vision, Las Condes, Chile, Dec. 11-18, 2015, pp. 3074-3082.
Mathieu et al., "Deep Multi-Scale Video Prediction Beyond Mean Square Error", arXiv:1511.05440v6, Feb. 26, 2016, 14 pages.
Milan et al., "Continuous Energy Minimization for Multitarget Tracking", IEEE Transactions on Pattern Analysis and Machine Intelligence, vol. 36, No. 1, Jan. 2014, pp. 58-72.
Milan et al., Detection- and Trajectory-Level Exclusion in Multiple Object Tracking, Conference on Computer Vision and Pattern Recognition, Columbus, Ohio, Jun. 25-27, 2013, 8 pages.
Milan et al., "Online Multi-Target Tracking Using Recurrent Neural Networks", Association for the Advancement of Artificial Intelligence, San Francisco, California, Feb. 4-9, 2017, 8 pages.
Nam et al., "Learning Multi-Domain Convolutional Neural Networks for Visual Tracking", Conference on Computer Vision and Pattern Recognition, Las Vegas, Nevada, Jun. 26-Jul. 1, 2016, pp. 4293-4302.
Osep et al., "Combined Image- and World-Space Tracking in Traffic Scenes", International Conference on Robotics and Automation, Singapore, China, May 29-Jun. 3, 2017, 8 pages.
Pellegrini et al., "You'll Never Walk Alone: Modeling Social Behavior for Multi-Target Tracking", International Conference on Computer Vision, Kyoto, Japan, Sep. 29-Oct. 2, 2009, pp. 261-268.
Redmon et al., "Yolo9000: Better, Faster, Stronger", Conference on Computer Vision and Pattern Recognition, Honolulu, Hawaii, Jul. 21-26, 2017, 9 pages.
Ren et al., "Faster R-CNN: Towards Real-Time Object Detection with Region Proposal Networks", Neural Information Processing Systems, Montreal, Canada, Dec. 7-12, 2015, 9 pages.
Riahi et al., "Multiple Object Tracking Based on Sparse Generative Appearance Modeling" International Conference on Image Processing, Quebec City, Canada, Sep. 27-30, 2015, 5 pages.

(56) References Cited

OTHER PUBLICATIONS

Shitrit et al., "Multi-Commodity Network Flow for Tracking Multiple People", IEEE Transactions on Pattern Analysis and Machine Intelligence, vol. 36, Issue 8, Aug. 2014, 14 pages.
Simonyan et al., "Very Deep Convolutional Networks for Large-Scale Image Recognition", arXiv:1409.1556v6, Apr. 10, 2015, 14 pages.
Spyropoulos et al., "Learning to Detect Ground Control Points for Improving the Accuracy of Stereo Matching", Conference on Computer Vision and Pattern Recognition, Columbus, Ohio, Jun. 24-27, 2014, 8 pages.
Srivastava et al., "Unsupervised Learning of Video Representations Using LSTMs", International Conference on Machine Learning, Lille, France, Jul. 6-11, 2015, pp. 843-852.
Tao et al., "Siamese Instance Search for Tracking", Conference on Computer Vision and Pattern Recognition, Las Vegas, Nevada, Jun. 26-Jul. 1, 2016, pp. 1420-1429.
Walker et al., "An Uncertain Future: Forecasting from Static Images Using Variational Autoencoders", arXiv:1606.07873v1, Jun. 25, 2016, 17 pages.
Wang et al., "Learning a Deep Compact Image Representation for Visual Tracking", Advances in Neural Information Processing Systems, Lake Tahoe, Nevada, Dec. 5-10, 2013, pp. 809-817.
Wang et al., "Learning Optimal Parameters for Multi-Target Tracking with Contextual Interactions", International Journal of Computer Vision, vol. 122, No. 3, 2017, pp. 484-501.
Wang et al., "Visual Tracking with Fully Convolutional Networks", International Conference on Computer Vision, Las Condes, Chile, Dec. 11-18, 2015, pp. 3119-3127.
Wu et al., "SqueezeDet: Unified, Small, Low Power Fully Convolutional Neural Networks for Real-Time Object Detection for Autonomous Driving", Honolulu, Hawaii, Jul. 21-26, 2017, 9 pages.
Xiang et al., "Learning to Track: Online Multi-Object Tracking by Decision Making", International Conference on Computer Vision, Las Condes, Chile, Dec. 11-18, 2015, 9 pages.
Yang et al., "An Online Learned CRF Model for Multi-Target Tracking", Conference on Computer Vision and Pattern Recognition, Providence, Rhode Island, Jun. 16-21, 2012, 8 pages.
Yoon et al., "Bayesian Multi-Object Tracking Using Motion Context from Multiple Objects", Winter Conference on Applications of Computer Vision, Waikoloa Beach, Hawaii, Jan. 6-9, 2015, 8 pages.
Yoon et al., "Online Multi-Object Tracking via Structural Constraint Event Aggregation", Conference on Computer Vision and Pattern Recognition, Las Vegas, Nevada, Jun. 26-Jul. 1, 2016, 9 pages.
Zbontar et al., "Computing the Stereo Matching Cost with a Convolutional Neural Network", Conference on Computer Vision and Pattern Recognition, Boston, Massachusetts, Jun. 8-10, 2015, 8 pages.
Zhang et al., "Global Data Association for Multi-Object Tracking Using Network Flows" Conference on Computer Vision and Pattern Recognition, Anchorage, Alaska, Jun. 23-28, 2008, 8 pages.

\* cited by examiner

END-TO-END TRACKING OF OBJECTS

RELATED APPLICATIONS

This application claims priority to and the benefit of U.S. Provisional Patent Application No. 62/586,700, titled "End-to-End Tracking of Objects," and filed on Nov. 15, 2017. U.S. Provisional Patent Application No. 62/586,700 is hereby incorporated by reference herein in its entirety.

FIELD

The present disclosure relates generally to improving the ability of computing systems to detect objects within a surrounding environment.

BACKGROUND

Many systems such as autonomous vehicles, robotic systems, and user computing devices are capable of sensing their environment and performing operations without human input. For example, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of detecting objects of interest. The method includes receiving, by a computing system comprising one or more computing devices, sensor data from one or more sensors configured to generate sensor data associated with an environment. The method includes inputting, by the computing system, the sensor data to one or more machine-learned models including one or more first neural networks configured to detect one or more objects in the environment based at least in part on the sensor data and one or more second neural networks configured to track the one or more objects over a sequence of sensor data inputs. The method includes generating, by the computing system as an output of the one or more first neural networks, a three-dimensional (3D) bounding box and detection score for each of a plurality of object detections. The method includes generating, by the computing system as an output of the one or more second neural networks, a matching score associated with object detections over the sequence of sensor data inputs. The method includes determining, by the computing system using a linear program, a trajectory for each object detection based at least in part on the matching scores associated with the object detections over the sequence of sensor data inputs.

Another example aspect of the present disclosure is directed to a computing system. The computing system includes a machine-learned model configured to receive sensor data representing an environment and in response to the sensor data to output one or more object trajectories. The machine-learned model includes one or more first neural networks configured to detect one or more objects based on the sensor data and one or more second neural networks configured to associate the one or more objects over a sequence of sensor data inputs. The computing system includes one or more processors and one or more non-transitory computer-readable media that store instructions, that when executed by the one or more processors, cause the one or more processors to perform operations. The operations include inputting, to the machine-learned model, training data including annotated sensor data indicating objects represented by the sensor data. The operations include detecting an error associated with one or more object trajectories generated by the machine-learned model relative to the annotated sensor data over a sequence of training data. The operations include backpropagating the error associated with the one or more object trajectories to the one or more first neural networks and the one or more second neural networks to jointly train the machine-learned model for object detection and object association.

Yet another example aspect of the present disclosure is directed to an autonomous vehicle. The autonomous vehicle includes a sensor system configured to generate sensor data of an environment external to the autonomous vehicle. The autonomous vehicle includes a vehicle computing system. The vehicle computing system includes one or more processors, and one or more non-transitory computer-readable media that store instructions, that when executed by the one or more processors, cause the computing system to perform operations. The operations include inputting sensor data from the sensor system to a machine-learned model including one or more first neural networks, one or more second neural networks, and a linear program. The machine-learned model is trained by backpropagation of detected errors of an output of the linear program to the one or more first neural networks and the one or more second neural networks. The operations include generating as an output of the one or more first neural networks a detection score for each of a plurality of object detections. The operations include generating as an output of the one or more second neural networks a matching score for pairs of object detections in a sequence of sensor data inputs. The operations include generating as an output of the linear program a trajectory for each of the plurality of object detections based at least in part on the matching scores for the pairs of object detections.

Other example aspects of the present disclosure are directed to systems, methods, vehicles, apparatuses, tangible, non-transitory computer-readable media, and memory devices for determining the location of an autonomous vehicle and controlling the autonomous vehicle with respect to the same.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
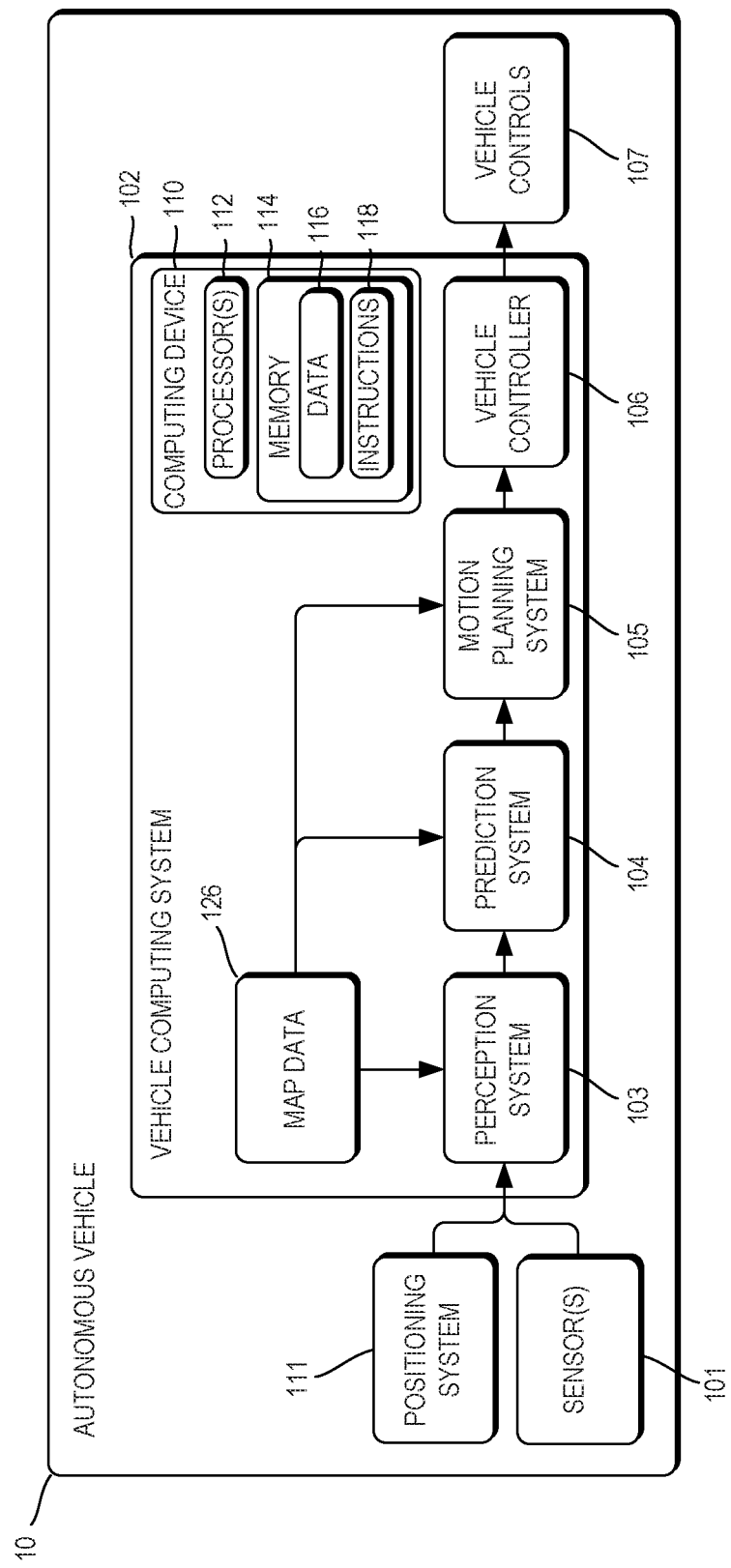
FIG. 1 is a block diagram of an example autonomous vehicle according to example embodiments of the present disclosure.

Generally, the present disclosure is directed to systems and methods that apply machine-learned models such as neural networks, for example, to object tracking in an improved manner. For example, the system and methods of the present disclosure can be included in or otherwise leveraged by an autonomous vehicle, non-autonomous vehicle, user computing device, robotic system, etc. to perform object tracking. In example embodiments, an end-to-end tracking framework is provided that includes one or more machine-learned models that are jointly trained by backpropagation for object detection and matching. In example embodiments, the machine-learned model(s) includes one or more first neural networks that are configured for object detection and one or more second neural networks that are configured for object matching, such as object association over multiple frames or other segments of input data such as, for example, image data and/or point-cloud data. In some implementations, the machine-learned model(s) includes a flow network that is configured to generate a flow graph based on object detection and object matching. Additionally in some implementations, the machine-learned model(s) includes a trajectory linear program that is configured to optimize candidate links from a flow graph to generate a trajectory for each tracked object. In example embodiments, the tracked objects may correspond to a predetermined group of classes, such as vehicles, pedestrians, bicycles, or other objects encountered within the environment of an autonomous vehicle or other system such as a user computing device.

More particularly, in some implementations, a computing system can receive sensor data from one or more sensors that are configured to generate sensor data relative to an autonomous vehicle or other system. In order to autonomously navigate, an autonomous vehicle can include a plurality of sensors (e.g., a LIDAR system, cameras, etc.) configured to obtain sensor data associated with the autonomous vehicle's surrounding environment as well as the position and movement of the autonomous vehicle. Other computing systems may include sensors configured to obtain sensor data for use in robotic planning, image recognition and object tracking, etc. The computing system can input the sensor data to one or more machine-learned models that include one or more first neural networks configured to detect one or more objects external to the autonomous vehicle based on the sensor data and one or more second neural networks configured to track the one or more objects over a sequence of sensor data inputs. The sensor data can be image data including RGB color values and/or LIDAR point cloud data. The computing system can generate, as an output of the one or more first neural networks, a three-dimensional (3D) bounding box and detection score for each of a plurality of object detections. The computing system can generate, as an output of the one or more second neural networks, a matching score associated with object detections over the sequence of the sensor data inputs. The computing system can generate, using a linear program, a trajectory for each object detection based at least in part on the matching scores associated with the object detections in the sequence of sensor data inputs.

In some implementations, the calculated trajectories can be provided to a prediction system that computes a predicted trajectory of an object. The predicted trajectory may be provided to a motion planning system which determines a motion plan for an autonomous vehicle based on the predicted trajectories.

In some implementations, the computing system can use a flow network to generate a flow graph based at least in part on the matching scores associated with the object detections in the sequence of sensor data inputs. The computing system can use a linear program to optimize the flow graph and generate the trajectory for each object detection. In some implementations, the computing system applies one or more linear constraints as part of generating the trajectory for each object detection using the linear program.

In some implementations, the computing system can generate the 3D bounding box for each object detection based on sensor data that includes one or more LIDAR pointclouds from one or more first sensors, such as a LIDAR sensor of a sensor system of the autonomous vehicle. The computing system can generate a detection score for each object detection based on RGB color values from one or more second sensors, such as a camera of the sensor system of an autonomous vehicle of other system.

In some implementations, the computing system can track objects over sequences of sensor data such as sequences of image data using a three-dimensional tracking technique. In example embodiments, the computing system uses a sensory fusion approach that combines LIDAR point clouds with RGB color values to provide accurate 3D positioning of bounding boxes that represent detected objects. Deep learning is applied to model both detections and matching. In some implementations, a matching network combines spatial (e.g., LIDAR) and appearance (e.g., RGB color value) information in a principled way that can provide improved match estimates when compared with traditional match scoring functions. For example, the computing system can create 3D bounding boxes using dense encodings of point clouds (e.g, front and/or birds-eye views) to produce proposals, followed by a scoring network that uses RGB data. In some implementations, object detections are treated as proposals to the matching network, and the matching network scores detections such that the tracking is optimized. For example, a convolutional stack can be used to extract features from RGB detections and perform linear regression over the activations to obtain a score. Thus, the computing system can score the detection potentials of the detector network so that the matching network is optimized. In this manner, improved computing performance may be achieved by lowering memory requirements and reducing the computations relative to backpropagating through each proposal for tracking.

In some implementations, a computing system is configured to train a machine-learned model to track multiple targets using a tracking by detection technique. The machine-learned model is trained to identify a set of possible objects in an image or other sensor data input, and also to associate the objects over time in subsequent images or sensor data inputs. In example embodiments, learning is performed end-to-end via minimization of a structured hinge-loss, including the simultaneous optimization of both the detector network and the matching network. More particularly, the model is trained to learn both the feature representations, as well as the similarity using a siamese network for example. Additionally, appearance and 3D spatial cues can be leveraged for matching by the matching network, as a result of the 3D object detector which produces 3D bounding boxes.

More particularly, in some implementations, a computing system is provided that inputs training data to a machine-learned model that is configured to generate object trajectories. The machine-learned model includes one or more first neural networks that are configured to detect one or more objects based on sensor data and one or more second neural networks that are configured to associate the one or more objects over a sequence of sensor data inputs. The training data may include sensor data that has been annotated to indicate objects represented in the sensor data, or any other suitable ground truth data that can be used to train a model for object detection. The computing system can detect an error associated with one or more object trajectories generated by the machine-learned model relative to the annotated sensor data over a sequence of the training data. The computing system can backpropagate the error associated with the one or more predicted object trajectories to the one or more first neural networks and the one or more second neural networks. By backpropagating the error, the computing system jointly trains the machine-learned model to detect the one or more objects and to match the one or more objects. After training, the machine-learned model can be used by an autonomous vehicle for generating motion plans for the autonomous vehicle. The machine-learned model can be used by other computing systems such as a user computing device for object tracking in association with image recognition, classification, etc.

In some implementations, the machine-learned-model is trained end-to-end using deep learning to model both the object detections, and the object associations. In this manner, the computations for detecting objects can be learned. Moreover, learned representations for tracking can be used in place of hand-engineered features. As such, the underlying computations involved in tracking do not necessarily have to be explicitly trained. Furthermore, the model for detecting and tracking objects can be trained jointly. This permits trajectories of objects to be optimized, followed by backpropagation through the entire model.

More particularly, a computing system according to example embodiments may include a perception system having one or more machine-learned models that have been jointly-trained for object detection and object tracking. The perception system can include an object detection component and an object association component (also referred to as object matching component). The object detection component can include a first set of convolutional neural networks (CNNs) in some implementations. The object association component can include a second set of CNNs in some implementations. The machine-learned model can include one or more flow networks configured to generate a flow graph based on an output of the object matching component and/or object detection component. The machine-learned model can include a trajectory linear program that can receive the output of the flow network and provide one or more trajectories based on the tracked object detections.

The object detection component can be configured to generate object detections based on sensor data such as RGB color values and/or LIDAR point clouds. For example, a 3D object detector in some implementations creates 3D bounding boxes using LIDAR pointcloud data to produce object proposals. The 3D object detector then generates a detection score for each object proposal using RGB data.

The object detection component can provide pairs of object detections to the object matching component. In some implementations, the object detection component provides to the flow network a detection score for each object detection.

The object matching component can receive a pair of object detections from the objection detection component. For example, the object matching component can receive 3D bounding boxes from the detection component. The object matching component can use both appearance and 3D spatial cues to generate a match score for each pair of object detections.

The flow network can receive the match scores from the object matching component and the detection scores from the object detection component. The flow network can generate a flow graph.

The machine-learned model can include a trajectory linear program that is configured to receive an output of the flow network, such as a cost of candidate trajectories or links between objects. In some implementations, the linear program applies one or more linear constraints to determine an object trajectory. In this manner, the computing system can analyze a sequence of sensor data inputs with representations of multiple objects and construct a trajectory for each object detection by linking objects over the sequence of inputs.

The machine-learned model can include a backpropagation component that is configured to backpropagate a detected error associated with generated trajectories to train the machine-learned model. The backpropagation component can train the machine-learned model end-to-end. In some implementations, the backpropagation component utilizes structured hinge-loss as the loss function. In example embodiments, this may permit backpropagation through stochastic sub-gradient descent.

An autonomous vehicle or other system including a computing system in accordance with example embodiments can use a machine-learned model that has been trained by backpropagation of trajectory errors to learn a detector and/or matching model. According to example embodiments, an autonomous vehicle or other system includes a sensor system configured to generate sensor data of an external environment and a computing system. The computing system can include one or more processors and one or more non-transitory computer-readable media. The computing system can provide sensor data from the sensor system as input to a machine-learned model including one or more first neural networks, one or more second neural networks, and a linear program. The machine-learned model has been trained by backpropagation of detected errors of an output of the linear program to the one or more first neural networks and the one or more second neural networks. The computing system can generate as an output of the one or more first neural networks a detection score for each of a plurality of object detections. The computing system can generate as an output of the one or more second neural networks a matching score for pairs of object detections in a sequence of sensor data inputs. The computing system can generate as an output of the linear program a trajectory for each object detection based at least in part on the matching scores for the pairs of object detections.

According to example embodiments, a machine-learned model can include one or more neural networks (e.g., deep neural networks), support vector machines, decision trees, ensemble models, k-nearest neighbors models, Bayesian networks, or other types of models including linear models and/or non-linear models. Example neural networks can include feed-forward neural networks, convolutional neural networks, recurrent neural networks (e.g., long short-term memory (LSTM) recurrent neural networks, gated recurrent unit (GRU) neural networks), or other forms of neural networks.

In some implementations, when training the machine-learned model to detect objects and match objects in different sensor data inputs, a training dataset can include a large number of previously obtained input images and corresponding labels that describe corresponding object data for objects detected within such input images. The labels included within the detector and tracking training dataset can be manually annotated, automatically annotated, or annotated using a combination of automatic labeling and manual labeling.

In some implementations, to train the model, a training computing system can input a first portion of a set of ground-truth data (e.g., a portion of a training dataset corresponding to input image data) into the machine-learned model to be trained. In response to receipt of the portion, the machine-learned model outputs trajectories based on neural networks that output object detections, detection scores, and/or object matching scores. This output of the machine-learned model predicts the remainder of the set of ground-truth data (e.g., a second portion of the training dataset). After the prediction, the training computing system can apply or otherwise determine a loss function that compares the trajectory output by the machine-learned model to the remainder of the ground-truth data which the model attempted to predict. The training computing system then can backpropagate the loss function through the model to train the model (e.g., by modifying one or more weights associated with the model). This process of inputting ground-truth data, determining a loss function and backpropagating the loss function through the model can be repeated numerous times as part of training the model. For example, the process can be repeated for each of numerous sets of ground-truth data provided within the training dataset.

More particularly, in some implementations, an autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle can include a computing system that assists in controlling the autonomous vehicle. In some implementations, the autonomous vehicle computing system can include a perception system, a prediction system, and a motion planning system that cooperate to perceive the surrounding environment of the autonomous vehicle and determine one or more motion plans for controlling the motion of the autonomous vehicle accordingly. The autonomous vehicle computing system can include one or more processors as well as one or more non-transitory computer-readable media that collectively store instructions that, when executed by the one or more processors, cause the autonomous vehicle computing system to perform various operations as described herein.

As an example, in some implementations, the motion planning system operates to generate new autonomous motion plan(s) for the autonomous vehicle multiple times per second. Each new autonomous motion plan can describe motion of the autonomous vehicle over the next several seconds (e.g., 5 seconds). Thus, in some example implementations, the motion planning system continuously operates to revise or otherwise generate a short-term motion plan based on the currently available data.

Once the motion planning system has identified the optimal motion plan (or some other iterative break occurs), the optimal candidate motion plan can be selected and executed by the autonomous vehicle. For example, the motion planning system can provide the selected motion plan to a vehicle controller that controls one or more vehicle controls (e.g., actuators that control gas flow, steering, braking, etc.) to execute the selected motion plan until the next motion plan is generated.

The perception system can incorporate one or more of the systems and methods described herein to improve the detection and tracking of objects within the surrounding environment based on the sensor data. The data generated using the end-to-end tracking techniques described herein can help improve the accuracy of the state data used by the autonomous vehicle. For example, the trajectories of tracked objects can be used to generate more accurate state data. The prediction system can determine predicted motion trajectories of the object(s) approximate to the autonomous vehicle. The tracked object trajectories generated by the tracking system can be used to improve the accuracy of the predicted motion trajectories generated by the prediction system. The improved tracked object trajectories and resultant predicted motion trajectories can improve the determination of the vehicle's motion plan.

The systems and methods of the present disclosure provide a number of technical effects and benefits. As one example, the techniques described herein enable a computing system to generate object trajectories based on an image or other sensor data using a machine-learned model that includes a detector component and tracking component that are jointly trained by backpropagation of detected trajectory errors. The computing system is able to jointly train neural networks associated with object detection and neural networks associated with object association and tracking. In this manner, the computing system can train the model to detect objects so as to optimize tracking of objects. The computing system may perform object detection and tracking with significantly reduced times and with greater accuracy. This can reduce the amount of processing required to implement the machine-learned model, and correspondingly, improve the speed at which predictions can be obtained.

As one example, the techniques described herein enable a computing system to use a machine-learned model that has been jointly trained for both object detection and object tracking. This architecture allows the computing system to jointly train the model for object detection and tracking. This may permit the computing system to train neural networks associated with object detection or matching, based on an optimization of tracking objects (e.g., generating object trajectories). Moreover, the use of a jointly-trained model can reduce the amount of computer resources required and increase the speed at which predictions can be obtained.

As one example, the techniques described herein enable a computing system to combine the training of detection networks and matching networks to more efficiently generate trajectories for tracking objects. Thus, the computing system can more efficiently and accurately identify and track objects using sensor data. By way of example, the more efficient and accurate detection and tracking of objects can improve the operation of self-driving cars.

Although the present disclosure is discussed with particular reference to autonomous vehicles, the systems and methods described herein are applicable to any convolutional neural networks used for any purpose. Further, although the present disclosure is discussed with particular reference to convolutional networks, the systems and methods described herein can also be used in conjunction with many different forms of machine-learned models in addition or alternatively to convolutional neural networks.

Although the present disclosure is discussed with particular reference to autonomous vehicles, the systems and methods described herein are applicable to the use of machine-learned models for object tracking by other systems. For example, the techniques described herein can be implemented and utilized by other computing systems such as, for example, user devices, robotic systems, non-autonomous vehicle systems, etc. (e.g., to track objects for advanced imaging operations, robotic planning, etc.). Further, although the present disclosure is discussed with particular reference to certain networks, the systems and methods described herein can also be used in conjunction with many different forms of machine-learned models in addition or alternatively to those described herein. The reference to implementations of the present disclosure with respect to an autonomous vehicle is meant to be presented by way of example and is not meant to be limiting.

FIG. 1 depicts a block diagram of an example autonomous vehicle 10 according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft, rail-based vehicles, etc.).

The autonomous vehicle 10 includes one or more sensors 101, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 includes a computing device 110 including one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause vehicle computing system 102 to perform operations.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the autonomous vehicle 10. The positioning system can be any device or circuitry for analyzing the position of the autonomous vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the autonomous vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object as described. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine one or more motion plans for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at their current and/or future locations.

As one example, in some implementations, the motion planning system 105 can evaluate one or more cost functions for each of one or more candidate motion plans for the autonomous vehicle 10. For example, the cost function(s) can describe a cost (e.g., over time) of adhering to a particular candidate motion plan and/or describe a reward for adhering to the particular candidate motion plan. For example, the reward can be of opposite sign to the cost.

The motion planning system 105 can provide the optimal motion plan to a vehicle controller 106 that controls one or more vehicle controls 107 (e.g., actuators or other devices that control gas flow, steering, braking, etc.) to execute the optimal motion plan. The vehicle controller can generate one or more vehicle control signals for the autonomous vehicle based at least in part on an output of the motion planning system.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

In various implementations, one or more of the perception system 103, the prediction system 104, and/or the motion planning system 105 can include or otherwise leverage one or more machine-learned models such as, for example convolutional neural networks.

Figure 2:
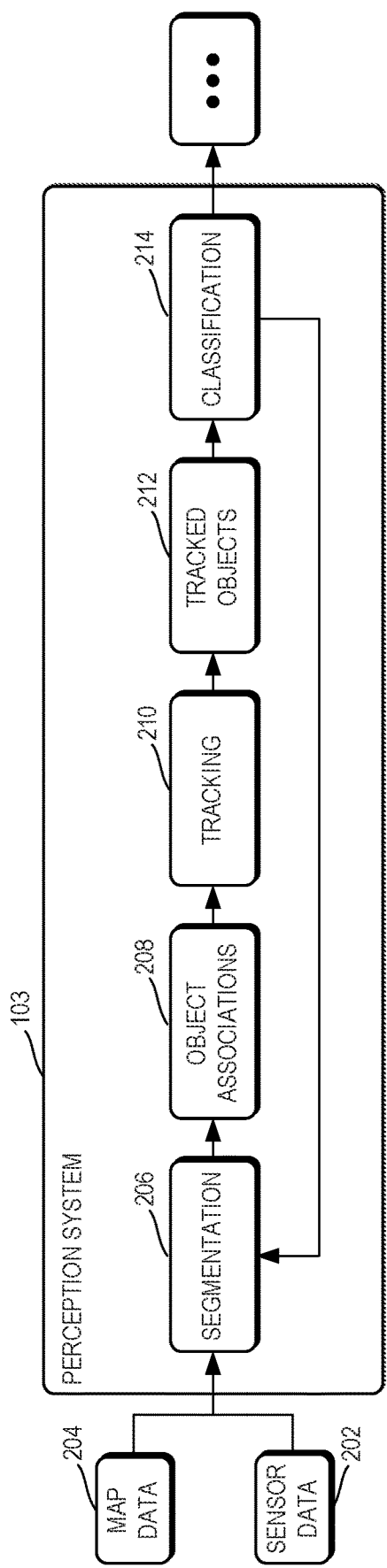
FIG. 2 depicts a block diagram of an example perception system according to example embodiments of the present disclosure.

FIG. 2 depicts a block diagram of an example perception system 103 according to example embodiments of the present disclosure. As discussed in regard to FIG. 1, a vehicle computing system 102 can include a perception system 103 that can identify one or more objects that are proximate to an autonomous vehicle 10. In some embodiments, the perception system 103 can include segmentation component 206, object associations component 208, tracking component 210, tracked objects component 212, and classification component 214. The perception system 103 can receive sensor data 202 (e.g., from one or more sensor(s) 101 of the autonomous vehicle 10) and map data 204 as input. The perception system 103 can use the sensor data 202 and the map data 204 in determining objects within the surrounding environment of the autonomous vehicle 10. In some embodiments, the perception system 103 iteratively processes the sensor data 202 to detect, track, and classify objects identified within the sensor data 202. In some examples, the map data 204 can help localize the sensor data to positional locations within a map data or other reference system.

Within the perception system 103, the segmentation component 206 can process the received sensor data 202 and map data 204 to determine potential objects within the surrounding environment, for example using one or more object detection systems. The object associations component 208 can receive data about the determined objects and analyze prior object instance data to determine a most likely association of each determined object with a prior object instance, or in some cases, determine if the potential object is a new object instance. The tracking component 210 can determine the current state of each object instance, for example, in terms of its current position, velocity, acceleration, heading, orientation, uncertainties, and/or the like. The tracked objects component 212 can receive data regarding the object instances and their associated state data and determine object instances to be tracked by the perception system 103. The classification component 214 can receive the data from tracked objects component 212 and classify each of the object instances. For example, classification component 214 can classify a tracked object as an object from a predetermined set of objects (e.g., a vehicle, bicycle, pedestrian, etc.). The perception system 103 can provide the object and state data for use by various other systems within the vehicle computing system 102, such as the prediction system 104 of FIG. 1.

According to example embodiments of the present disclosure, structure prediction and deep neural networks are used together for 3D tacking of objects. One example formulates the problem as inference in a deep structured model, where potentials (also referred to as factors) are computed using a set of feedforward neural networks. Inference according to a machine-learned model in some implementations is performed accurately and efficiently using a set of feedforward passes followed by solving a linear program. In some examples, a machine-learned model is formulated for training end-to-end. Deep learning can be used for modeling detections as well as matching. More particularly, a specifically-designed matching network combines spatial and appearance information in a structured way that results in accurate matching estimates. Appearance matching can be based on a fully convolutional network in some examples. In this manner, optical flow can be omitted and learning can be performed using backpropagation. Reasoning is applied in three-dimensions in some examples. Moreover, a spatial branch of one or more matching networks is provided in some examples which can correct for motion of the autonomous vehicle and car resemblance. This architecture may provide improvements when compared with piece-wise training of individual detection and matching networks by gradient boosting, for example.

Figure 3:
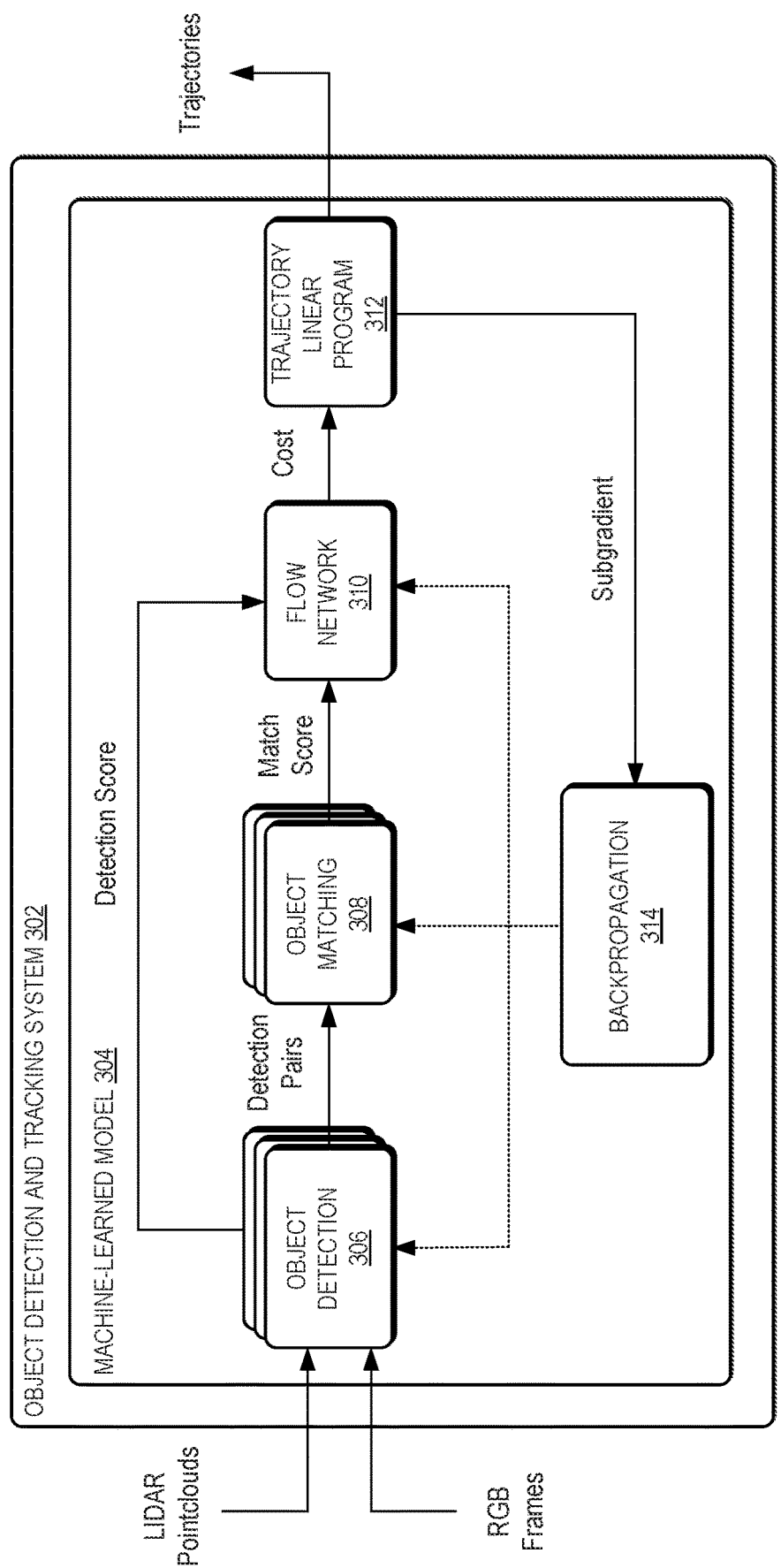
FIG. 3 depicts an example of an object detection and tracking system according to example embodiments of the present disclosure.

FIG. 3 depicts a block diagram of an example object detection and tracking system 302 of an autonomous vehicle or other system according to example embodiments of the present disclosure. In some examples, object detection and tracking system 302 may form part of perception system 103. For instance, object detection and tracking system 302 may be included within or form a part of segmentation component 206, object associations component 208, tracking component 210, and/or tracked objects component 212. In particular, FIG. 3 illustrates an example embodiment of a perception system which provides object detection and object matching within a perception system (e.g., perception system 103 of FIG. 1) in order to generate one or more object trajectories. In some embodiments, the object detection and tracking system 302 can detect potential objects of interest based at least in part on data (e.g., image sensor data, LIDAR data, RADAR data, etc.) provided from one or more sensor systems included in the autonomous vehicle or other system. For example, in some embodiments, a camera system of a sensor system (e.g., sensors 101 of FIG. 1) of an autonomous vehicle can generate image sensor data such as RGB frames as depicted in FIG. 3 and provide the image sensor data to a vehicle computing system of the autonomous vehicle (e.g., vehicle computing system 102 of FIG. 1). Similarly, a LIDAR system of a sensor system of an autonomous vehicle can generate LIDAR sensor data such as LIDAR point clouds as depicted in FIG. 3 and provide the LIDAR sensor data to the vehicle computing system.

Object detection and tracking system 302 includes a machine-learned model 304 which is configured to receive sensor data from a sensor system and to provide one or more object trajectories for one or more objects detected based on the sensor data. As illustrated in FIG. 3, RGB frames and LIDAR point clouds are provided to object detection component 306 within machine-learned model 304. Object detection component 306 includes one or more first neural networks configured to detect one or more objects based on input sensor data such as RGB frames and LIDAR point clouds received over a sequence of frames or other unit of sensor data. The one or more first neural networks can be one or more first convolutional neural networks in some examples. For each detected object, object detection component 306 generates a detection score indicating a level of probability or confidence that the detection is a true positive detection. Each detection score is provided from object detection component 306 to a flow network component 310. In addition, object detection component 306 provides an indication of each object detection to object matching component 308. For instance, and as shown in FIG. 3, object detection component 306 may provide pairs of object detections to object matching component 308. In some examples, object detection component 306 provides each possible pair of object detections to object matching component 308.

In some examples, the one or more first neural networks of object detection component 306 include one or more outputs that provide a three dimensional (3D) bounding box for each object detection. For example, each detection pair provided from object detection component 306 to object matching component 308 may include a 3D bounding box for each object detection. The one or more outputs of the neural networks of object detection component 306 can further provide a detection score for each object detection. In some implementations, the 3D bounding box for each object detection may be generated based on sensor data including one or more LIDAR point clouds from one or more first sensors. The detection score for each object detection may be generated based on RGB data from one or more second sensors. The 3D bounding box and detection score can be based on a predetermined optimization of the one or more second neural networks in some examples as described hereinafter. For instance, object detection component 306 can be trained based on the back propagation of errors associated with object matching component 308, such as may be incorporated in the generation of trajectories by trajectory linear program 312.

Object matching component 308 includes one or more second neural networks configured to receive object detections from object detection component 306, and provide a match score for each pair of object detections. In some examples, the one or more second neural networks are one or more second convolutional neural networks. For each pair of object detections, the match score may indicate a level of probability or confidence that the object detections correspond to the same physical object. In some examples, the second neural networks may include one or more outputs that provide a matching score associated with object detections over a sequence of sensor data inputs to the machine-learned model. Each match score can be provided from object matching component 308 to flow network component 310. In this manner, the second neural network(s) can associate one or more objects over a sequence of sensor data inputs.

Flow network component 310 can be configured to generate a flow graph based at least in part on the match scores provided by object matching component 308. In FIG. 3, flow network component 310 is configured to receive detection scores from object detection component 306 and match scores from object matching component 308. Flow network component 310 can include or be configured to generate a graph representing potential object detections over time. For example, the flow network may generate nodes in the flow graph based on object detections generated by object detection component 306. Edges or links between nodes in the graph are generated based on the match scores generated by object matching component 308. Machine-learned model 304 can be trained to generate a flow graph using flow network component 310. Flow network component 310 can provide a cost associated with each edge in the flow graph to trajectory linear program 312. In this manner, trajectory linear program 312 can generate one or more object trajectories based at least in part on a cost associated with the flow graph. More particularly, the one or more object trajectories can be generated based on cost associated with linking object detections over a sequence of sensor data inputs.

Trajectory linear program 312 provides one or more linear constraints while optimizing the flow graph to generate one or more object trajectories for each detected object. For example, a set of linear constraints can be employed to encode conservation of flow in order to generate non-overlapping trajectories. In some examples, two or more constraints per detection can be used. A first constraint may provide that the detection cannot be linked to two detections belonging to the same sensor data input such as a frame of sensor data. A second constraint may provide that in order for a detection to be a positive, it has to either be linked to another detection in the previous frame or the trajectory should start at that detection. A third constraint may provide that a detection can only end if the detection is active and not linked to another detection in the next frame.

Trajectory linear program 312 can determine a trajectory for each object detection based at least in part on the match scores associated with object detections over the sequence of sensor data inputs. The trajectory linear program 312 can determine the trajectory for each object detection based at least in part on the flow graph. The trajectory for each object detection can be determined based on the one or more linear constraints provided by trajectory linear program 312. In some examples, the trajectories may be determined based on a cost provided by flow network component 310 associated with linking object detections over a sequence of sensor data inputs.

In this manner, machine-learned model 304 can learn how to associate object detections over time based on a detection in each frame of sensor data as determined by object detection component 306. Object matching component 308 can compute a similarity for detections in each frame. As such, the detection score for each object detection can be generated by the first neural network(s) based on a predetermined optimization of the second neural networks. Moreover, the detection score can be generated based on an optimization of the one or more second neural networks for generating matching scores.

In various embodiments, machine-learned model 304 can be trained end to end by jointly training the various neural networks of the model. For example, errors detected in the computed trajectories can be backpropagated through the machine-learned model 304 using a backpropagation component 314. In this manner, the first neural network(s) and the second neural network(s) can be trained based at least in part on detected errors of trajectories generated using the trajectory linear program 312 during training. A sub-gradient can be computed using a structured hinge lost based on an error between a predicted trajectory and an actual trajectory. The sub-gradient can be backpropagated into the machine-learned model 304 to train object detection component 306, object matching component 308, and/or flow network component 310.

In some examples, machine-learned model 304 can be trained by inputting training data including annotated sensor data indicating objects represented by the sensor data. Errors associated with one or more object trajectories generated by the trajectory linear program 312 can be detected. The errors may be detected based on a comparison of generated trajectories to the annotated sensor data over a sequence of training data. The error associated with the one or more object trajectories can be back propagated to the first neural networks and the second neural networks to jointly train the machine-learned model for object detection and object association (also referred to as matching). The error be back propagated by computing a structured hinge-loss loss function based on one or more linear constraints of trajectory linear program 312. Based on the backpropagated the error, the first neural networks can be modified for object detection in order to optimize the second neural networks for object matching in some examples.

Figure 4:
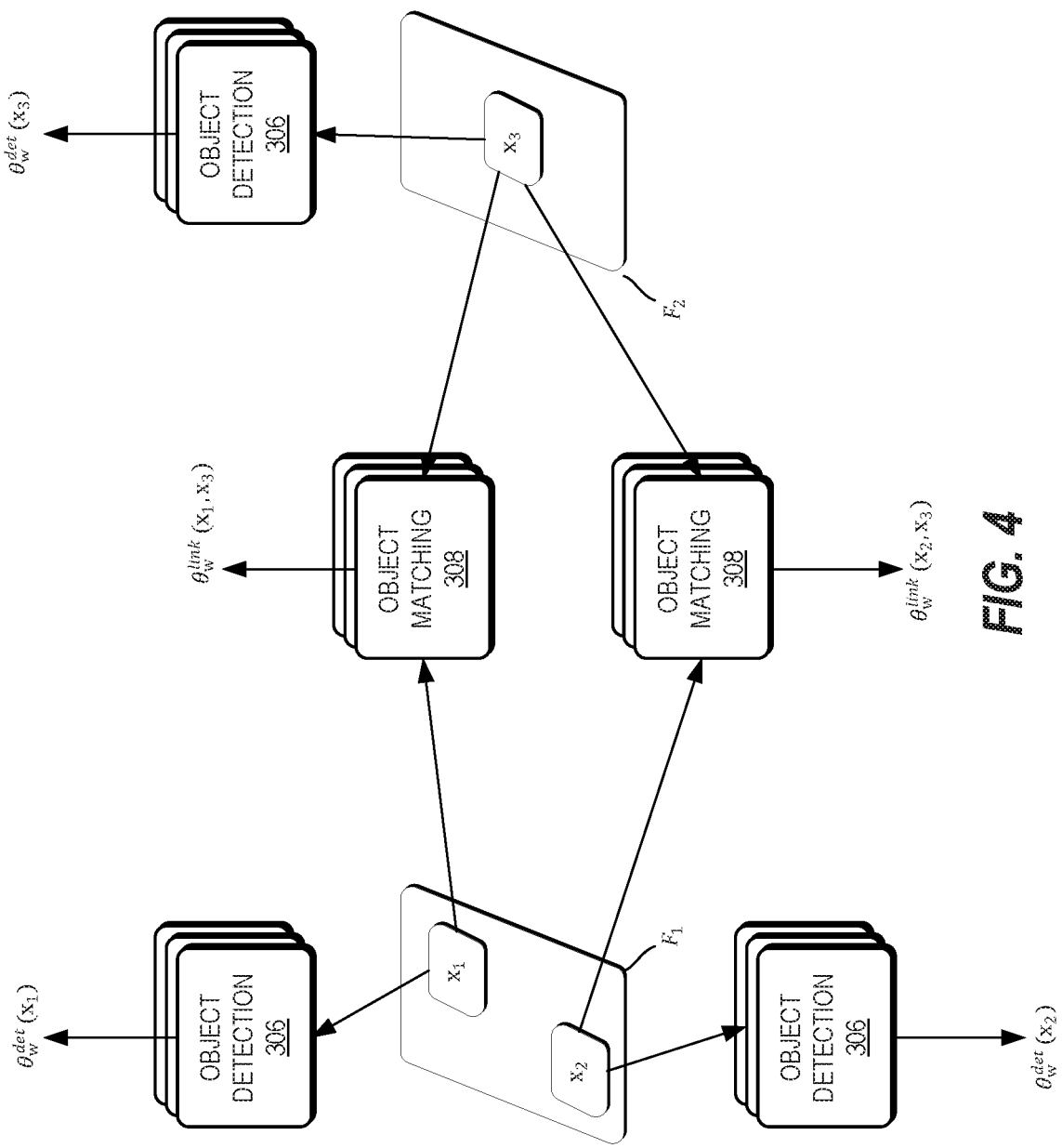
FIG. 4 depicts an example of a machine-learned model including forward passes over a set of object detections from two data frames according to example embodiments of the present disclosure.

A specific example is now described whereby a machine-learned model can be formulated. The formulated and trained machine-learned model can be used as shown in FIG. 4 for object detection and association. For example, consider a set of candidate detections $x=[\chi_1, \chi_2, \ldots \chi_k]$ estimated over a sequence of frames of arbitrary length. The machine-learned model can be configured to estimate which detections are true positive as well as link them over time to form trajectories. In many cases, the number of targets is unknown and can vary over time (e.g., objects can appear any time and disappear when they are no longer visible).

FIG. 4 depicts a specific example including two input frames F1 and F2 from a sequence of sensor data inputs (e.g., image data, LIDAR data, RADAR data, etc.) Frames F1 and F2 can be analyzed to detect objects and link them over time. Object detection component 306 detects a first candidate detection x1 and a second candidate detection x2 in frame F1. Similarly, object detection component 306 detects a third candidate detection x3 in frame F2. Object detection component 306 generates a detection score for each candidate detection. A first candidate detection score $\theta_w^{det}(x_1)$ represents a probability or confidence that the first candidate detection x1 is a true positive. A second candidate detection score $\theta_w^{det}(x_2)$ represents a probability or confidence that the second candidate detection x2 is a true positive. A third candidate detection score $\theta_w^{det}(x_{31})$ represents a probability or confidence that the third candidate detection x3 is a true positive. Object matching component 308 generates a match score for each pair of candidate detections subject to one or more linear constraints. In this example, a match score is not generated for the pair formed from the first candidate detection x1 and the second candidate detection x2. Because candidate detection x1 and candidate detection x2 are in the same frame F1, the machine-learned model does not compute a match score. The two detections are known to be from different objects because of their presence in a single frame. A first candidate detection score $\theta_w^{link}(x_1, x_3)$ represents a probability or confidence that the first candidate detection x1 and the second candidate detection x3 correspond to the same object. A second candidate detection score $\theta_w^{link}(x_2, x_3)$ represents a probability or confidence that the second candidate detection x2 and the third candidate detection x3 correspond to the same object.

A detailed explanation of computing detection scores and map scores using one or more machine-learned model in accordance with embodiments of the disclosed technology is now described. In some implementations, the problem can be parameterized with four types of variables. More particularly, for each candidate detection $\chi_j$, a binary variable $y_j^{det}$ can be introduced, encoding if the detection is a true positive. Further, a binary variable $y_{j,k}^{link}$ can be introduced, representing if the j-th and k-th detections belong to the same object. Finally, for each detection $\chi_j$ two additional binary variables $y_j^{new}$ and $y_j^{end}$ can be introduced, encoding whether it is the beginning or the end of a trajectory, respectively. The variables $y_j^{new}$ and $y_j^{end}$ can be used to penalize fragmentations in some implementations. The four binary variables can be collapsed for a full video sequence into a vector $y = (y^{det}, y^{link}, y^{new}, y^{end})$ encoding all candidate detections, matches, entries, and exits.

In some implementations, a scoring function for each random variable (which may also be referred to as a potential function) can be assigned which is represented by the output of a neural network. In particular, convolutional neural networks can be employed to predict scores for each detection (e.g., using one or more neural networks of object detection component 306) and for the matching of pairs of detections (e.g., using one or more neural networks of object matching component 308) in some examples. The scoring functions can be collapsed in a vector $\theta_w(x) = (\theta_w^{det}(x), \theta_w^{link}(x), \theta_w^{new}(x), \theta_w^{end}(x))$. These parameters can be learned end-to-end in some implementations.

In some implementations, a set of linear constraints (e.g., two per detection) can be employed, encoding conservation of flow in order to generate non-overlapping trajectories (e.g., using trajectory linear program 312 to optimize a flow graph of flow network component 310). The conservation of flow can be encoded based on the fact or assumption that two detections belonging to the same frame should not be linked. Furthermore, in order for a detection to be a positive, it should either be linked to another detection in the previous frame or a trajectory including the detection should start at that point. Additionally, a detection should only end if the detection is active and not linked to another detection in the next frame. Based on these constraints, Equation 1 can be defined for each detection.

$$y_j^{new} + \sum_{k \in \mathcal{N}^-(j)} y_{j,l}^{link} = y_j^{end} + \sum_{k \in \mathcal{N}^+(j)} y_{j,k}^{link} = y_j^{det} \forall j \quad \text{Equation 1}$$

In Equation 1, $\mathcal{N}(j)$ denotes the candidate links of detection $\chi_j$. More particularly, $\mathcal{N}^-(j)$ denotes the detections in the immediately preceding frame and $\mathcal{N}^+(j)$ denotes the detections in the immediately following frame. These constraints can be collapsed into matrix form, i.e., Ay=0.

Thus, according to example embodiments, tracking-by-detection can be formulated as the integer linear program shown in Equations 2 and 3.

$$\text{maximize } \theta_w(x)y \quad \text{Equation 2}$$
$$\text{subject to } Ay = 0, y \in \{0, 1\}^{|y|} \quad \text{Equation 3}$$

As shown in Equations 2 and 3, a multi-target tracking problem can be formulated as a constrained integer programming problem. Typically, integer programming can be considered NP-Hard (non-deterministic polynomial-time hardness). In some implementations, it can be assumed that a constraint matrix as defined above exhibits a total unimodularity property, although this is not required. With a total unimodularity property assumed, the problem may be relaxed to a linear program while ensuring optimal integer solutions. Thus, the integer program shown in Equations 2 and 3 can be reformulated as shown in Equations 4 and 5 in some implementations.

$$\text{maximize } \theta_w(x)y \quad \text{Equation 4}$$
$$\text{subject to } Ay = 0, y \in [0, 1]^{|y|} \quad \text{Equation 5}$$

In some embodiments, a min cost flow problem can be used as an alternative formulation for the linear program. A min cost flow problem can be solved using Bellman-Ford and/or Successive Shortest Paths (SSP) techniques. The same solution may be achieved with these techniques in example embodiments. In some implementations, a Gurobi solver can be used to solve a constrained linear program problem.

In example embodiments, a tracking-by-detection deep structured model can be trained end-to-end (e.g., using backpropagation component 314). Towards this goal, a structured hinge-loss can be used as the loss function in some implementations. In this manner, backpropagation through stochastic sub-gradient descent can be used. In some implementations, the loss function can be defined as shown in Equation 6.

$$\mathcal{L}(x, y, W) = \max\left\{0, \sum_{x \in \mathcal{X}} \left[\max_y (\Delta(y, \hat{y}) + \theta_w(x)(y - \hat{y}))\right]\right\} + \lambda\|W\|^2 \quad \text{Equation 6}$$

To compute the loss, an inner maximization over y for the batch $\mathcal{X}$ can be solved. In some implementations, this may include solving the linear program (LP) of Equation 4 and Equation 5, augmented by the task loss ($\Delta(y, \hat{y})$). The task loss, in example embodiments, can be defined as the Hamming distance between the inferred variable values and the ground truth. Thus, the loss augmented inference can be defined as shown in Equation 7 in some implementations.

$$y^* = \underset{y}{\text{argmax}} (\Delta(y, \hat{y}) + \theta_w(x)y) \quad \text{Equation 7}$$

In some implementations, the maximization of Equation 7 is subject to the constraints shown in Equation 1. Accordingly, a sub-gradient with respect to $\theta_w(x)$ can be defined as shown in Equation 8.

$$\frac{\partial \mathcal{L}(x, y, W)}{\partial \theta_w(x)} = \begin{cases} 0 & S \leq 0 \\ y^* - \hat{y} & \text{otherwise} \end{cases} \quad \text{Equation 8}$$

In some implementations, $\theta_w(x)$ denotes a set of neural networks such that solving the problem can be continued by employing backpropagation.

A detailed description of the cost functions that can be employed according to example embodiments is provided hereinafter by way of example and not limitation. According to some examples for the detection potential $\theta_w^{det}(x)$, a single forward pass can be computed for each detection. For the variables, $\theta_w^{new}(x)$ and $\theta_w^{end}(x)$, it may be possible to not compute any passes since these variables are learned constants. To obtain $\theta_w^{link}(x)$ in some implementations, a number of forward passes can be computed that is equal to a number of combinations between the detections of two subsequent frames. In some examples, pruning can be employed to reduce the number of computations by not computing the score for detections that are too far away to represent the same object.

More particularly, in some implementations, the detection potential $\theta_w^{det}(x)$ encodes the fact that it may be preferred to create trajectories that contain high scoring detections. The detection potential can be multiplied by the binary random variable $y^{det}$. Thus, the detection potential value can be defined via a feedforward pass of a neural network of object detection component 306 that scores detections. In particular, a 3D detector can be used which creates 3D bounding boxes via a sensory fusion approach of using dense encodings of the front and bird-eye views of the LIDAR pointclouds to produce proposals. This can be followed by a scoring network using RGB data. In some examples, because of memory constraints and the resources and/or time needed to backpropagate through thousands of proposals for each frame in the context of tracking, the detections can be treated as proposals to the network. The network can then score the detections such that the tracking methods are optimized. In some implementations, a convolutional stack can be employed to extract features from the RGB detections, and linear regression can be performed over the activations to obtain a detection score and/or match score.

According to example embodiments for the link potential $\theta_w^{link}(x)$, the potential encodes the fact that it may be preferred to link into the same trajectories detections that have similar appearance and spatial configuration. The link potential can be multiplied by the binary random variable$^{link}$. It can be noted that a link hypothesis can be generated for detections between consecutive frames and not detections that happen in the same frame. Like previously, the potential can be defined as a feedforward pass of a neural network of object matching component 308. More particularly, in some implementations, a siamese architecture can be applied to extract features from the images based on a fully convolutional neural network, where the fully connected layers are removed. This may provide a 13-layer convolutional neural network in a specific example. Removing the fully connected layers can improve the model both in terms of computational time and memory footprint, while having a minimal drop in accuracy. In a specific example, each detection input can be resized to be 224×224 pixels. To produce a concise representation of activations without using fully connected layers in some implementations, each of the max-pool outputs can be passed through a product layer (skip-pooling) followed by a weighted sum, which produces a single scalar for each max-pool layer. This can result in an activation vector of size 5. Furthermore, reasoning about space in the network can be performed using two MLPs (multilayer perceptrons). One MLP can take as input a pair of occupancy grids (e.g., size 180×200 pixels in bird's eye view) and another MLP can take as input an occupancy grid of size 37×124 pixels from the front view. Each 3D detection can be encoded as a rectangle of ones with rotation and scale set to reflect the object. In some implementations, by default the observation coordinates are relative to the autonomous vehicle (i.e., the observer). However, since the autonomous vehicle's speed in each axis is known, the displacement of the observer between each frame can be calculated and the coordinates can be translated accordingly, such that both grids are on the same coordinate system.

In some implementations, the new potentials $\theta_w^{new}(x)$ and $\theta_w^{end}(x)$ encode a likelihood that a detection is on the limit of a trajectory. The potential $\theta_w^{new}(x)$ encodes how likely it is for a detection to be on the beginning of a trajectory, and $\theta_w^{end}(x)$ encodes how likely it is for a detection to be on the end of a trajectory. Learned constant weights $w_{new}$ and $w_{end}$ can be employed, which can be multiplied by the binary random variables $y^{new}$ and $y^{end}$, respectively.

Figure 5:
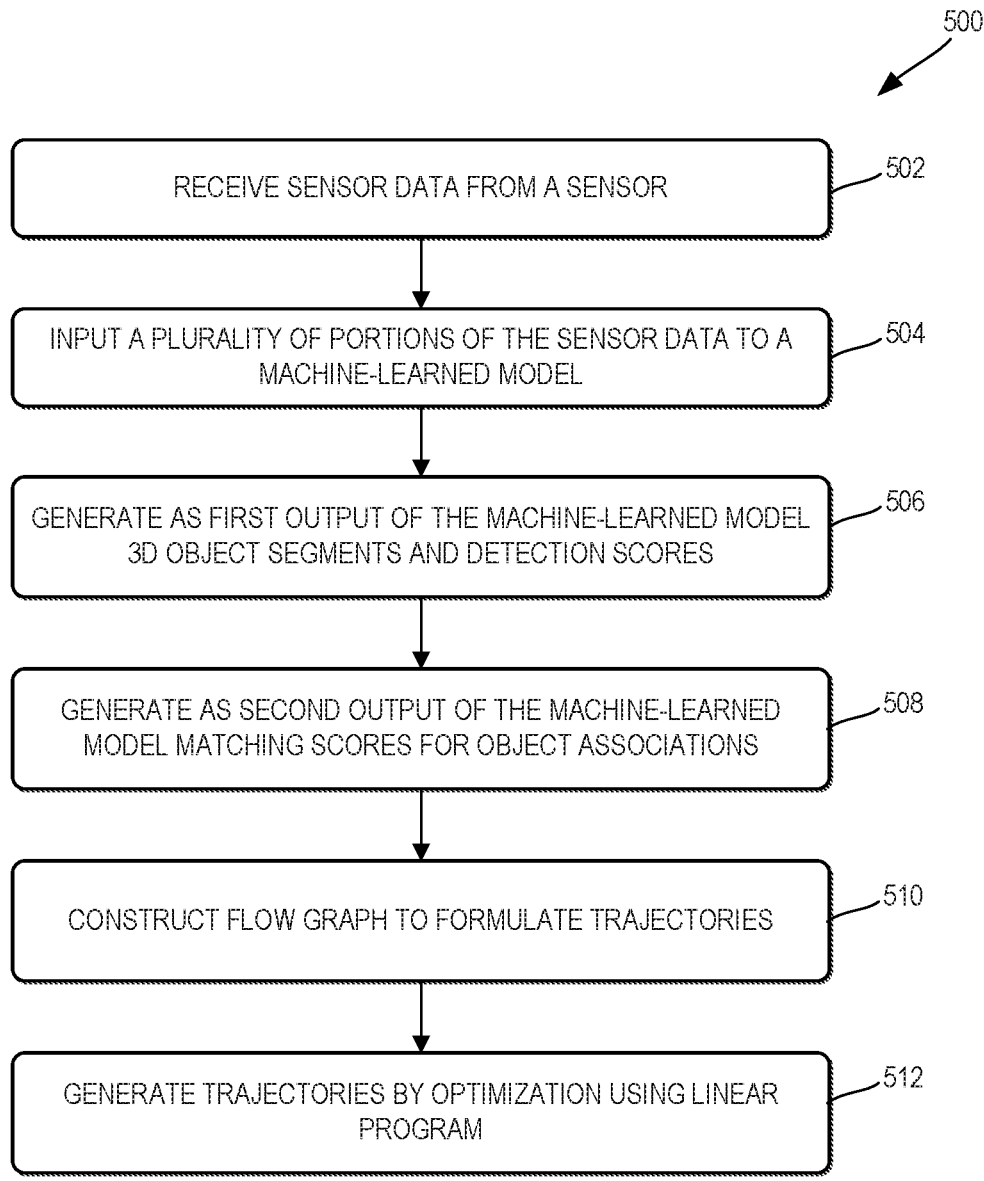
FIG. 5 depicts a flowchart diagram of an example process of object detection and tracking according to example embodiments of the present disclosure.

FIG. 5 is a flowchart diagram depicting an example process 500 of object detection and tracking using a machine-learned model that is trained end-to-end accordance with example embodiments of the disclosed technology. The machine-learned model may include a flow network for generating flow graphs based on object detection scores and match scores, and include a linear program that generates trajectories for detected objects based on an optimization of the flow graphs. One or more portions of process 500 (and processes 550 described hereinafter) can be implemented by one or more computing devices such as, for example, the computing devices 110 within vehicle computing system 102 of FIG. 1, or example computing system 1000 of FIG. 8. Moreover, one or more portions of the processes described herein can be implemented as an algorithm on the hardware components of the devices described herein (e.g., as in FIGS. 1 and 2) to, for example, generate trajectories based on detecting objects from sensor data and matching detections from multiple frames or other portion of sensor data. In example embodiments, process 500 may be performed by an object detection and tracking system 302, included within a perception system 103 of a vehicle computing system 102 or other computing system.

At 502, sensor data is received from one or more sensors. The sensor data can be received at one or more computing devices within a computing system in example embodiments. In some embodiments, the sensor data is LIDAR data from one or more LIDAR sensors positioned on or in an autonomous vehicle, RADAR data from one or more RADAR sensors positioned on or in the autonomous vehicle, or image data from one or more image sensors (e.g., cameras) positioned on or in the autonomous vehicle. In some embodiments, a perception system implemented in the vehicle computing system, such as perception system 103 of FIG. 1, can generate the sensor data received at 502 based on image sensor data received from one or more image sensors, LIDAR sensors, and/or RADAR sensors of a sensor system, such as sensor system including sensors 101 of FIG. 1. In other examples, the sensors may be positioned on or in other systems, such as robotic systems, user computing devices (mobile computing device, phone, tablet, etc.), and the like.

At 504, a plurality of portions of the sensor data can be input to one or more machine-learned models. The machine-learned model(s) into which the sensor data can be provided as input at 504 can correspond, for example, to a machine-learned model 304 of FIG. 3. The plurality of portions of the sensor data may include a plurality of frames of image data, LIDAR data, and/or RADAR data, or another portion from a sequence of sensor data inputs. The machine-learned model may include one or more first neural networks configured to detect objects based on the sensor data. The machine-learned model may include one or more second neural networks configured to match or otherwise associate object detections from different portions of sensor data, such as from different frames of a sequence of images. The one or more second neural networks may be configured to track one or more objects over a sequence of sensor data inputs.

At 506, 3D object segments and detection scores can be generated as a first output of the machine-learned model. For example, the one or more first neural networks configured for object detection can generate a first output including the 3D object segments and detection scores. In some examples, the detection scores are provided to a flow network and the 3D object segments are provided to the one or more second neural networks. The 3D object segments may be 3D bounding boxes corresponding to a detected object in example embodiments.

At 508, matching scores are generated for pairs of object detections from different portions of the sensor data. For example, the one or more second neural networks configured for object matching can generate the second output including the matching scores. In some embodiments, the matching scores are provided to the flow network. A matching score can be generated for each pair of object detections in some examples.

At 510, a flow graph is constructed to formulate a trajectory for each object detection. The flow graph may be generated by assigning each object detection to a node in the graph. The edges or links between nodes may be constructed based on the output of the one or more second neural networks, such as the matching scores between object detections represented as nodes in the graph.

At 512, one or more trajectories are generated for each object detection by optimization using a linear program. For example, the flow graph may be optimized based at least in part on an analysis of the path between object detections. For instance, the linear program may optimize the flow graph to find the shortest path between nodes or object detections. Additionally, optimization may apply one or more linear constraints. For example, a first linear constraint may provide that an object detection cannot be linked to two detections belonging to the same frame. For instance, the linear constraint may provide that by linking an object detection from a first frame to an object detection in a second frame, that the object detection from the first frame cannot be linked to another object detection in the second frame, and likewise, that the object detection from the second frame cannot be linked to another object detection in the first frame. A second linear constraint may provide that an object detection should either be linked to another object detection in a previous frame or the trajectory for the object detection should begin with the current frame. A third constraint can provide that a detection can only end if the object detection is active and not linked to another object detection in a subsequent frame.

Although FIG. 5 depicts steps performed in a particular order for purposes of illustration and discussion, the methods of the present disclosure are not limited to the particularly illustrated order or arrangement. The various steps of process 500 (and process 600 described hereinafter) can be omitted, rearranged, combined, and/or adapted in various ways without deviating from the scope of the present disclosure.

Figure 6:
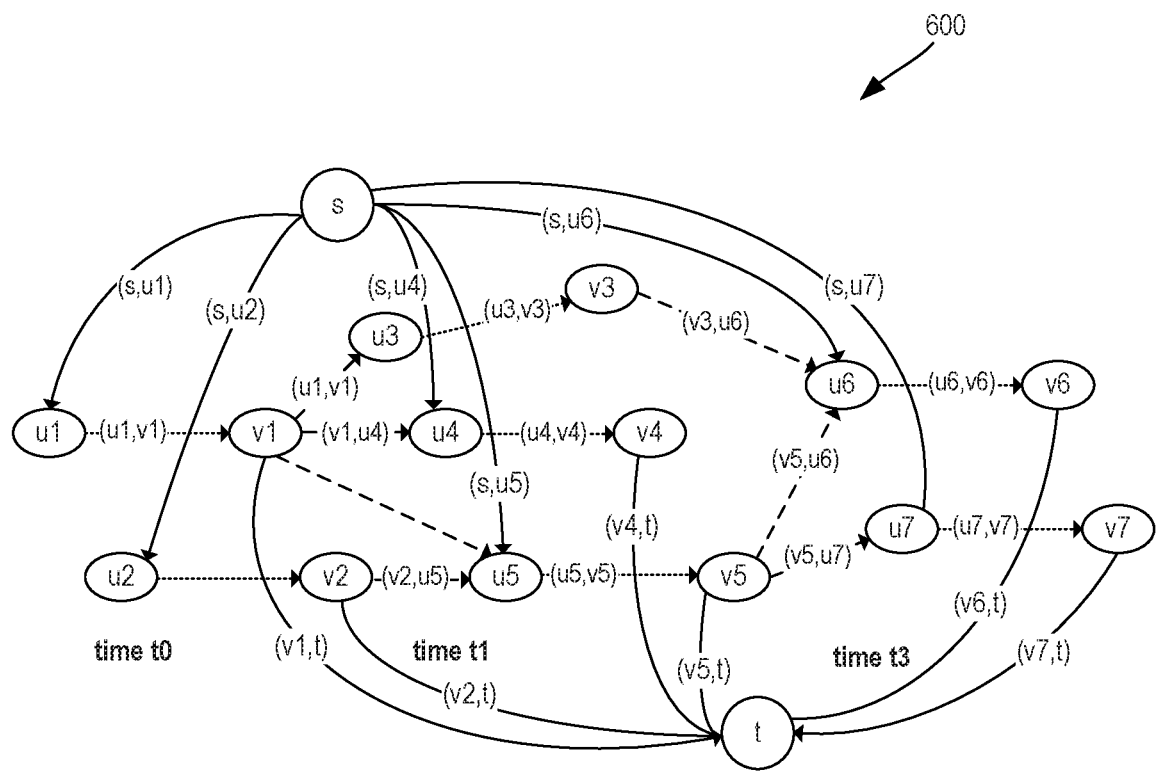
FIG. 6 is an example of a flow graph that can be used in accordance with example embodiments of the present disclosure.

FIG. 6 depicts an example of a flow graph 600 of flow network component 310 in accordance with example embodiments of the present disclosure. The flow graph may be generated based on object detection scores and object matching scores which are provided as an output of one or more neural networks of a machine-learned model. In example embodiments, a flow graph 600 may be generated by or as part of flow network component 310 based on an output of one or more first neural networks of object detection component 306 and an output of one or more second neural networks of object matching component 308. In this manner, machine-learned model 304 may autonomously generate a flow graph based on sensor data, without human engineering of cost computations for links in the graph.

Flow graph 600 includes a first plurality of nodes u1, u2, u3, u4, u5, u6, and u7 which represent candidate object detections based on the sensor data. Flow graph 600 includes a second plurality of nodes v1, v2, v3, v4, v5, v6, and v7 which represent final object detections based on the candidate object detections. For example, the final object detections correspond to candidate object detections which are determined to correspond to actual objects (i.e., true positives). In another example, the candidate object detections may represent object detections corresponding to objects of any type or class, and the final object detections may represent object detections corresponding to objects of a particular type or class (e.g., vehicle). The first plurality of nodes and second plurality of nodes may be provided or generated based on one or more outputs of object detection component 306. For instance, the nodes may be generated based on object detections (e.g., 3D bounding boxes) provided by object detection component 306. Node 's' represents the start of the trajectory and node 't' represents the end of a trajectory. Thus, a node linked to the 's' node represents the start of an object trajectory, and a node linked to the T node represents the end of an object trajectory.

Flow graph 600 includes links between nodes representing an association or matching between nodes. Flow graph includes a first plurality of links comprising observation edges that begin at the first plurality of nodes and end at the second plurality of nodes. The observation edges represent associations between candidate object detections and final object detections. For example, observation edge (u1,v1) represents an association between candidate object detection u1 at time t0 and final object detection v1. Observation edge (u2,v2) represents an association between candidate object detection u2 at time t0 and final object detection v2. Observation edge (u3,v3) represents an association between candidate object detection u3 at time t1 and final object detection v3. Observation edge (u4,v4) represents an association between candidate object detection u4 at time t1 and final object detection v4. Observation edge (u5,v5) represents an association between candidate object detection u5 at time t1 and final object detection v5. Observation edge (u6,v6) represents an association between candidate object detection u6 at time t2 and final object detection v6. Observation edge (u7,v7) represents an association between candidate object detection u7 at time t2 and final object detection v7.

Flow graph 600 includes a second plurality of links comprising transition edges that begin at the second plurality of nodes and end at a subset of the first plurality of nodes at times t1 and t2. The transition edges represent candidate links between the final object detections at a first time and candidate object detections at a subsequent time. Transition edge (v1,u3) represents a candidate link between final object detection v1 and candidate object detection u3 at time t1. Transition edge (v1,u4) represents a candidate link between final object detection v1 and candidate object detection u4 at time t1. Transition edge (v1,u5) represents a candidate link between final object detection v1 and candidate object detection u5 at time t1. Transition edge (v2,u5) represents a candidate link between final object detection v2 and candidate object detection u5 at time t1. Transition edge (v3,u6) represents a candidate link between final object detection v3 and candidate object detection u6 at time t2. Transition edge (v5,u6) represents a candidate link between final object detection v5 and candidate object detection u6 at time t2. Transition edge (v5,u6) represents a candidate link between final object detection v5 and candidate object detection u6 at time t2. Transition edge (v3,u7) represents a candidate link between final object detection v5 and candidate object detection u7 at time t2.

Flow graph 600 includes a third plurality of links comprising enter edges that begin at a start node 's' and end at a candidate object detection. The enter edges represent the start of a trajectory of an object detection. Enter edge (s,u1) represents the start of a trajectory for candidate object detection u1 at time t0. Enter edge (s,u2) represents the start of a trajectory for candidate object detection u2 at time t0. Enter edge (s,u4) represents the start of a trajectory for candidate object detection u4 at time t1. Enter edge (s,u5) represents the start of a trajectory for candidate object detection u5 at time t1. Enter edge (s,u6) represents the start of a trajectory for candidate object detection u6 at time t2. Enter edge (s,u7) represents the start of a trajectory for candidate object detection u7 at time t0.

Flow graph 600 includes a fourth plurality of links comprising exit edges that begin at a final object detection and end at termination node 't'. The exit edges represent the end of the trajectory of an object detection. Exit edge (v1,t) represents the end of a trajectory for final object detection v1 at time t0. Exit edge (v2,t) represents the end of a trajectory for final object detection v2 at time t0. Exit edge (v4,t) represents the end of a trajectory for final object detection v4 at time t1. Exit edge (v5,t) represents the end of a trajectory for final object detection v5 at time t1. Exit edge (v6,t) represents the end of a trajectory for final object detection v6 at time t2. Exit edge (v7,t) represents the end of a trajectory for final object detection v7 at time t2.

Trajectory linear program 312 can optimize the flow graph to identify the final set of object detections and the links between them in order to generate object trajectories. For instance, trajectory linear program 312 may determine which of the links are active. Given a detection in each portion of sensor data such as a frame, the machine-learned model can be trained to associate the detections over time or a sequence of sensor data. Object matching component 308 may compute a similarity between object detections (e.g., detection pairs) and provide the similarity to flow network component 310 to generate a flow graph 600. The flow graph 600 can then be optimized with trajectory linear program 312 to optimize the trajectories provided as an output of machine-learned model 304. For example, the linear program may determine that u1 is a valid detection so it goes into v1. The linear program determines that observation edge (u1,v1) is active. The linear program may then decide that node v1 is the same as node u4 such that transition edge (v1,u4) is active. The linear program may then decide that u4 the valid detection to goes into v4. The linear program can determine that transition edge (u4,v4) is active. The linear program may then decide that object detection is not linked to any subsequent object detections. Accordingly, the linear program determines that object detection v4 ends at time t1. The linear program can activate exit edge (v4,t).

Figure 7:
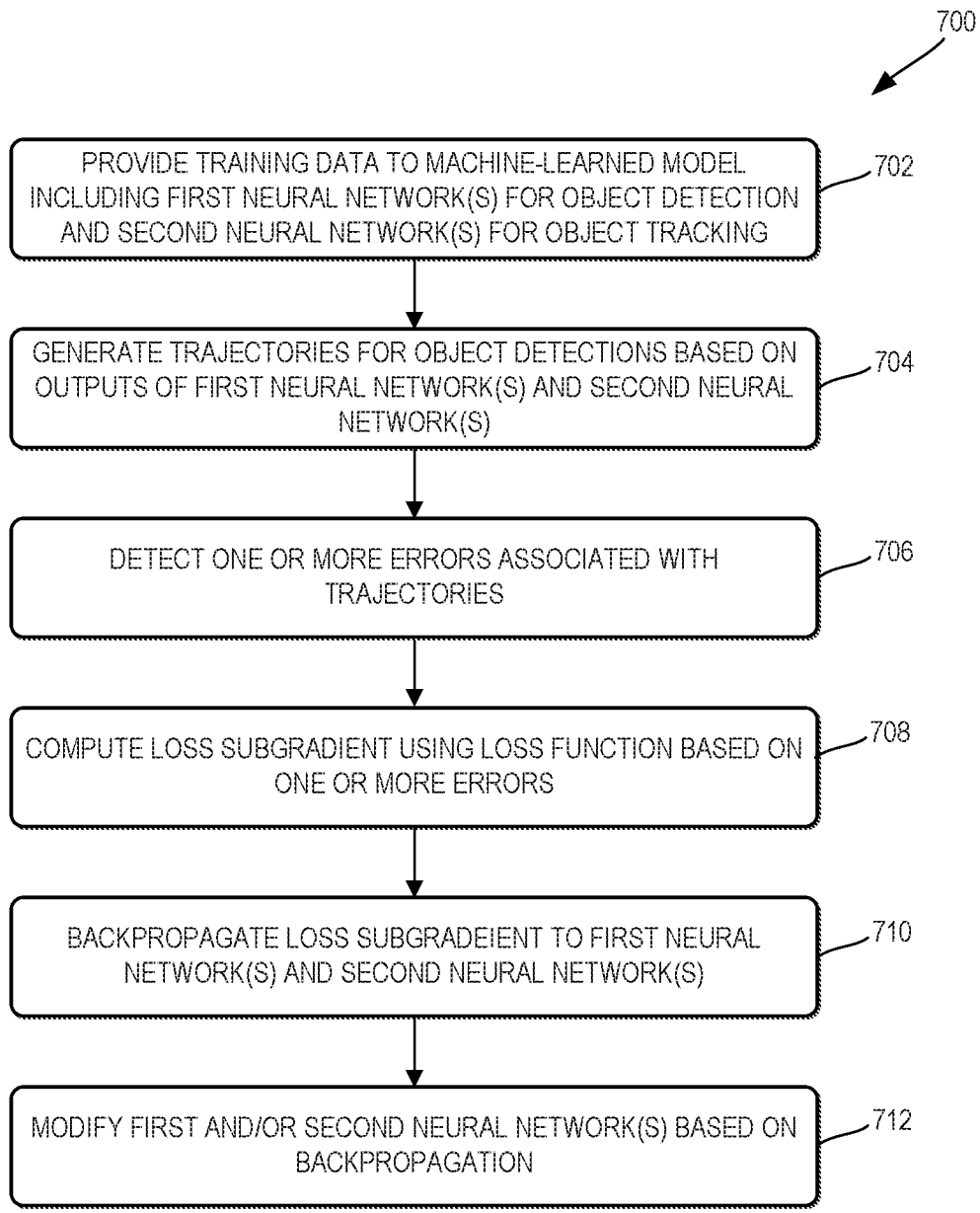
FIG. 7 depicts a flowchart diagram of an example process of training a machine-learned model by joint learning of a neural network for object detection and a neural network for objection tracking.

FIG. 7 is a flowchart diagram depicting a process 700 of training a machine-learned model including one or more first neural networks configured for object detection and one or more second neural networks configured for object matching. Process 700 can be used for end to end training of the machine-learned model including jointly training the first neural networks and the second neural networks. In example embodiments, process 700 may be performed by a machine learning computing system configured to train one or more machine-learned models based on training data.

At 702, training data can be provided to a machine-learned model that includes one or more first neural networks for object detection and one or more second neural networks for object matching. The machine-learned model may additionally include a flow network and/or a trajectory linear program configured to optimize the flow network in order to generate object trajectories. The training data may include sensor data such as image data, LIDAR data, RADAR data, etc. that has been annotated to indicate objects represented in the sensor data, or any other suitable ground truth data that can be used to train the model for object detection, object matching, and object trajectory generation.

At 704, the machine-learned model generates trajectories for object detection based on outputs of the one or more first neural networks and the one or more second neural networks. The trajectories may be generated by optimizing a flow graph constructed based on object detection an object matching. The trajectories may represent movement of the objects over a sequence of frames or other portions of sensor data.

At 706, one or more errors are detected in association with the trajectories generated at 504. Detecting the one or more errors may include determining a loss function that compares a generated trajectory with the ground truth data. For example, the trajectories generated at 554 can be compared with the ground truth data which the model attempted to predict. The one or more errors can be detected based on a deviation or difference between the predicted trajectory and the ground truth data.

At 708, a loss sub-gradient can be computed using a loss function based on the one or more errors detected at 556. In some examples, the computing system can determine a loss function based on comparing the output of the machine-learned model and the ground truth data. A structured hinge-loss can be used as a loss function in one example. It is noted that the loss sub-gradient can be computed based on the object trajectories, rather than the object detections or the object matching individually in some implementations.

At 710, the loss of gradient is back propagated to the one or more first neural networks and the one or more second neural networks. In some example loss of gradient can be further back propagated to the flow network. The loss function computed based on the object trajectories is used to train the first neural network(s) for object detection as well as the second neural network(s) for object matching. In this manner, the object trajectory errors can be used to train the machine-learned model end-to-end. This can be compared with techniques that compute an error associated with object detection in an effort to train an object detection model and that compute a separate error associated with object matching in an effort to train an object matching model.

At 712, the one or more first neural networks and/or the one or more second neural networks or modified based on the back propagation. For example, the neural network can be modified by adjusting one or more weights of the neural network based on the loss function.

Figure 8:
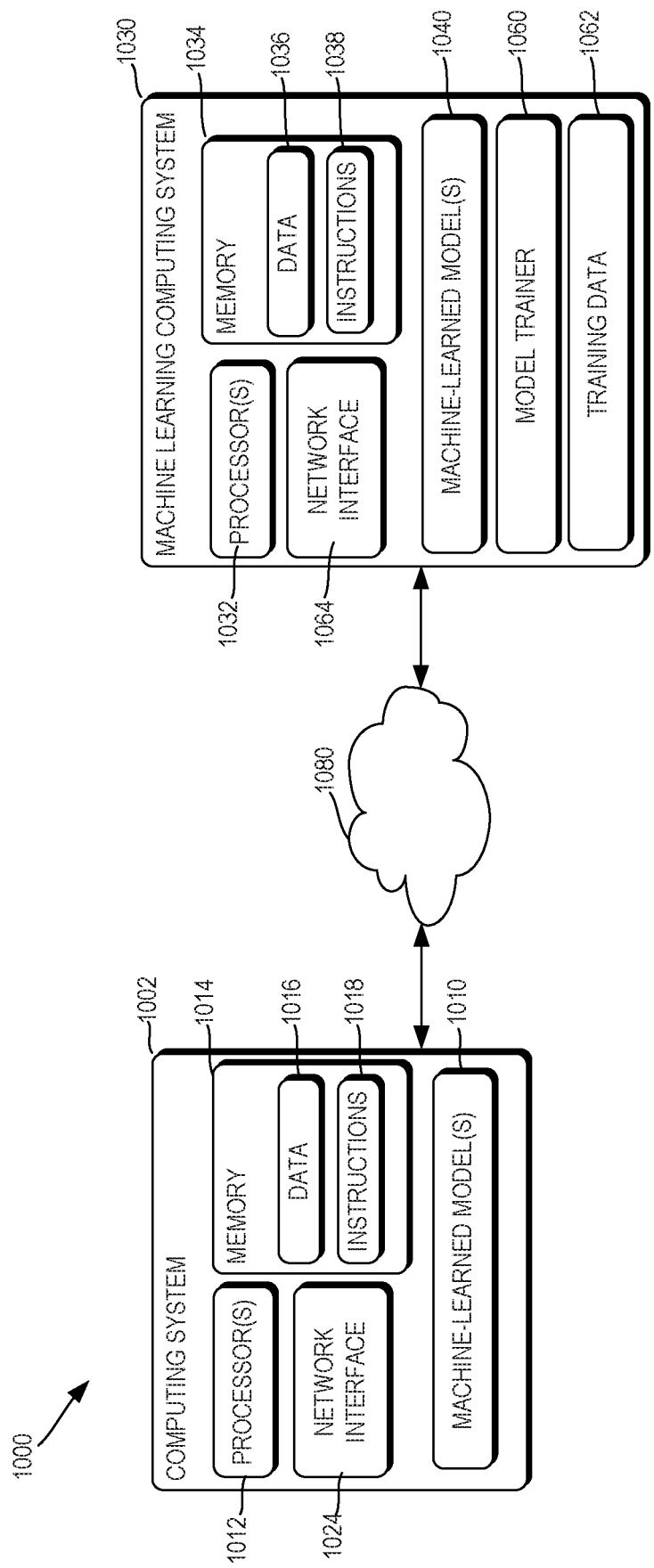
FIG. 8 depicts a block diagram of an example computing system according to example embodiments of the present disclosure.

FIG. 8 depicts a block diagram of an example computing system 1000 according to example embodiments of the present disclosure. The example computing system 1000 includes a computing system 1002 and a machine learning computing system 1030 that are communicatively coupled over a network 1080.

In some implementations, the computing system 1002 can perform object detection and matching, as well as object trajectory generation using a machine-learned model. In some implementations, the computing system 1002 can be included in an autonomous vehicle. For example, the computing system 1002 can be on-board the autonomous vehicle. In some embodiments, computing system 1002 can be used to implement vehicle computing system 102. In other implementations, the computing system 1002 is not located on-board the autonomous vehicle. For example, the computing system 1002 can operate offline to obtain imagery and perform object detection, matching, and trajectory generation. The computing system 1002 can include one or more distinct physical computing devices.

The computing system 1002 includes one or more processors 1012 and a memory 114. The one or more processors 1012 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processors 1012. For instance, the memory 1014 (e.g., one or more non-transitory computer-readable storage mediums, memory devices) can store data 116 that can be obtained, received, accessed, written, manipulated, created, and/or stored. The data 1016 can include, for instance, image or other sensor data captured by one or more sensors, machine-learned models, etc. as described herein. In some implementations, the computing system 1002 can obtain data from one or more memory device(s) that are remote from the computing system 1002.

The memory 1014 can also store computer-readable instructions 1018 that can be executed by the one or more processors 1012. The instructions 1018 can be software written in any suitable programming language or can be implemented in hardware. Additionally, or alternatively, the instructions 1018 can be executed in logically and/or virtually separate threads on processor(s) 1012.

For example, the memory 1014 can store instructions 1018 that when executed by the one or more processors 1012 cause the one or more processors 1012 to perform any of the operations and/or functions described herein, including, for example, generating machine-learned models, generating object detections, generating object trajectories, etc.

According to an aspect of the present disclosure, the computing system 1002 can store or include one or more machine-learned models 1010. As examples, the machine-learned models 1010 can be or can otherwise include various machine-learned models such as, for example, neural networks (e.g., deep neural networks or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1002 can receive the one or more machine-learned models 1010 from the machine learning computing system 1030 over network 1080 and can store the one or more machine-learned models 1010 in the memory 1014. The computing system 1002 can then use or otherwise implement the one or more machine-learned models 1010 (e.g., by processor(s) 1012). In particular, the computing system 1002 can implement the machine-learned model(s) 1010 to detect objects and generate or predict object trajectories from sensor data.

The machine learning computing system 1030 includes one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof. In some embodiments, machine learning computing system 1030 can be used to implement vehicle computing system 102.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. The data 1036 can include, for instance, machine-learned models and flow graphs as described herein. In some implementations, the machine learning computing system 1030 can obtain data from one or more memory device(s) that are remote from the machine learning computing system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032.

For example, the memory 1034 can store instructions 1038 that when executed by the one or more processors 1032 cause the one or more processors 1032 to perform any of the operations and/or functions described herein, including, for example, jointly training a machine-learned model for both object detection and object matching from sensor data, including generating and optimizing a flow graph using a linear program.

In some implementations, the machine learning computing system 1030 includes one or more server computing devices. If the machine learning computing system 1030 includes multiple server computing devices, such server computing devices can operate according to various computing architectures, including, for example, sequential computing architectures, parallel computing architectures, or some combination thereof.

In addition or alternatively to the machine-learned model(s) 1010 at the computing system 1002, the machine learning computing system 1030 can include one or more machine-learned models 1040. As examples, the machine-learned models 1040 can be or can otherwise include various machine-learned models such as, for example, neural networks (e.g., deep neural networks) or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1030 can communicate with the computing system 1002 according to a client-server relationship. For example, the machine learning computing system 1030 can implement the machine-learned models 1040 to provide a web service to the computing system 1002. For example, the web service can provide object segments or object trajectories in response to sensor data received from an autonomous vehicle.

Thus, machine-learned models 1010 can located and used at the computing system 1002 and/or machine-learned models 1040 can be located and used at the machine learning computing system 1030.

In some implementations, the machine learning computing system 1030 and/or the computing system 1002 can train the machine-learned models 1010 and/or 1040 through use of a model trainer 1060. The model trainer 1060 can train the machine-learned models 1010 and/or 1040 using one or more training or learning algorithms. One example training technique is backwards propagation of errors. In some implementations, the model trainer 1060 can perform supervised training techniques using a set of labeled training data. In other implementations, the model trainer 1060 can perform unsupervised training techniques using a set of unlabeled training data. The model trainer 1060 can perform a number of generalization techniques to improve the generalization capability of the models being trained. Generalization techniques include weight decays, dropouts, or other techniques.

In particular, the model trainer 1060 can train a machine-learned model 1010 and/or 1040 based on a set of training data 1062. The training data 1062 can include, for example, ground truth data including object annotations for sensor data portions. The model trainer 1060 can be implemented in hardware, firmware, and/or software controlling one or more processors.

In some examples, the model trainer 160 can jointly train a machine-learned model 1010 and/or 1040 having different neural networks for object detection and object matching. One or more neural networks for object detection and one or more neural networks for object matching can be jointly trained. In some example, both types of neural networks may be trained based on the output of a linear program. The output of the linear program can include object trajectories. A loss function based on error in object trajectory predictions can be backpropagated to train both the object detection neural networks and the object matching neural networks.

The computing system 1002 can also include a network interface 1024 used to communicate with one or more systems or devices, including systems or devices that are remotely located from the computing system 1002. The network interface 1024 can include any circuits, components, software, etc. for communicating with one or more networks (e.g., 1080). In some implementations, the network interface 1024 can include, for example, one or more of a communications controller, receiver, transceiver, transmitter, port, conductors, software and/or hardware for communicating data. Similarly, the machine learning computing system 1030 can include a network interface 1064.

The network(s) 1080 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

FIG. 8 illustrates one example computing system 1000 that can be used to implement the present disclosure. Other computing systems can be used as well. For example, in some implementations, the computing system 1002 can include the model trainer 1060 and the training data 1062. In such implementations, the machine-learned models 1010 can be both trained and used locally at the computing system 1002. As another example, in some implementations, the computing system 1002 is not connected to other computing systems.

In addition, components illustrated and/or discussed as being included in one of the computing systems 1002 or 1030 can instead be included in another of the computing systems 1002 or 1030. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method of detecting objects of interest, comprising:

receiving, by a computing system comprising one or more computing devices, sensor data from one or more sensors configured to generate sensor data associated with an environment;

inputting, by the computing system, the sensor data to one or more machine-learned models including one or more first neural networks configured to detect one or more objects in the environment based at least in part on the sensor data and one or more second neural networks configured to track the one or more objects over a sequence of sensor data inputs;

generating, by the computing system as an output of the one or more first neural networks, a three-dimensional (3D) bounding box and detection score for each of a plurality of object detections;

generating, by the computing system as an output of the one or more second neural networks, a matching score associated with object detections over the sequence of sensor data inputs;

generating, by the computing system using a flow network, a flow graph based at least in part on the matching scores; and determining, by the computing system using a linear program, a trajectory for each object detection based at least in part on the matching scores associated with the object detections over the sequence of sensor data inputs, wherein determining the trajectory for each object detection is based at least in part on the flow graph.

2. The computer-implemented method of claim 1, wherein:

determining the trajectory for each object detection comprises determining the trajectory for each object detection based on one or more linear constraints.

3. The computer-implemented method of claim 1, wherein:

generating a 3D bounding box comprises generating the 3D bounding box for each object detection based on sensor data including one or more LIDAR pointclouds from one or more first sensors; and generating a detection score for each object detection comprises generating the detection score based on red, green, blue (RGB) data from one or more second sensors.

4. The computer-implemented method of claim 1, wherein:

generating, as an output of the one or more first neural networks, the 3D bounding box and detection score for each object detection is based on a predetermined optimization of the one or more second neural networks.

5. The computer-implemented method of claim 1, wherein:

generating, as an output of the one or more first neural networks, the detection score for each object detection comprises generating the detection score based on optimization of the one or more second neural networks for generating matching scores.

6. The computer-implemented method of claim 1, wherein:

the one or more machine-learned models are trained end-to-end by training the one or more first neural networks and the one or more second neural networks based at least in part on detected errors of trajectories generated using the linear program during training.

7. The computer-implemented method of claim 1, wherein the one or more sensors are configured to generate sensor data relative to an autonomous vehicle:

the method further comprises generating, by the computing system, one or more vehicle control signals for the autonomous vehicle based at least in part on trajectories for the object detections.

8. The computer-implemented method of claim 1, wherein:

the one or more first neural networks are one or more first convolutional neural networks; and the one or more second neural networks are one or more second convolutional neural networks.

9. The computer-implemented method of claim 1, wherein:

the sensor data input to the one or more machine-learned models includes first image data and second image data, the first image data representing an earlier point in time than the second image data.

* * * * *